United States Patent

Kubo et al.

Patent Number: 6,123,522
Date of Patent: Sep. 26, 2000

[54] TURBO MOLECULAR PUMP

[75] Inventors: Atsushi Kubo, Matsubara; Hirochika Ueyama, Hirakata, both of Japan

[73] Assignee: Koyo Seiko Co., Ltd., Osaka, Japan

[21] Appl. No.: 09/118,011

[22] Filed: Jul. 17, 1998

[30] Foreign Application Priority Data

Jul. 22, 1997 [JP] Japan .................................. 9-194694

[51] Int. Cl.[7] .................................................. F25D 3/02
[52] U.S. Cl. ................... 417/423.4; 417/63; 417/423.12
[58] Field of Search ........................... 417/423.4, 423.12, 417/63

[56] References Cited

U.S. PATENT DOCUMENTS

| | | | |
|---|---|---|---|
| 4,717,315 | 1/1988 | Miki et al. | 417/365 |
| 5,443,368 | 8/1995 | Weeks et al. | 417/27 |
| 5,618,167 | 4/1997 | Hirakawa et al. | 417/372 |
| 5,765,995 | 6/1998 | Springer | 417/40 |

FOREIGN PATENT DOCUMENTS

| | | |
|---|---|---|
| 61-290229 | 12/1986 | Japan . |
| 2-252996 | 10/1990 | Japan . |
| 4-185911 | 7/1992 | Japan . |
| 5-231380 | 9/1993 | Japan . |

*Primary Examiner*—William Doerrler
*Assistant Examiner*—Chen-wen Jiang
*Attorney, Agent, or Firm*—Jacobson, Price, Holman & Stern, PLLC

[57] ABSTRACT

In a turbo molecular pump having a rotor magnetically supported in a non-contact manner by a magnetic bearing, a pump controller has a magnetic bearing controller having a programmable digital signal processor. This digital signal processor not only controls the magnetic bearing, but also controls the heater, thus serving as a temperature regulator.

3 Claims, 5 Drawing Sheets

TURBO MOLECULAR PUMP

FIELD OF THE INVENTION

The present invention relates to a turbo molecular pump in which a rotor constituting the pump is magnetically supported in a non-contact manner by a magnetic bearing.

DESCRIPTION OF THE PRIOR ART

Conventionally, a turbo molecular pump for supporting a rotor in non-contact manner with a magnetic bearing may have therein a heater as heating means to prevent compressed gas from being condensed and then sticking and depositing inside of the pump. In such pump, a temperature detector is arranged in a pump body so as to prevent overheat of the heater. Further, there is provided a temperature regulator in a pump controller which is provided separately from the pump body to control the magnetic bearing etc. The temperature regulator controls the heater in response to an output signal of the temperature detector.

In the above-mentioned conventional turbo molecular pump having heating means, provision of the temperature regulator in the pump controller makes the pump controller large in size, thereby increasing the cost.

OBJECT AND SUMMARY OF THE INVENTION

To overcome the above-mentioned shortcomings, an object of the present invention is to offer a turbo molecular pump in which, even though heating means is disposed, the pump controller can be made small in size to thereby lower the cost, and in which the heating means can flexibly be controlled.

A turbo molecular pump in the present invention comprises:
  a pump body including a magnetic bearing for magnetically supporting a rotor in a non-contact manner, a position detector for detecting a position of said rotor, heating means, and a temperature detector; and
  a pump controller for controlling said magnetic bearing in response to an output of said position detector, said pump controller including digital processing means in which a temperature control process for said heating means based on an output of said temperature detector and another control process other than said temperature control process are executed by a software program.

Examples of the digital processing means include a microcomputer, a digital signal processor and the like. The digital signal processor is a specific hardware component which is programmable and capable of executing a high-speed real-time processing. This is hereinafter referred to as DSP.

In the above-mentioned turbo molecular pump, the digital processing means disposed in the pump controller execute the temperature control process for the heating means in addition to the control process other than the temperature control process. It is therefore not required to dispose a temperature regulator in the pump controller. This enables the pump controller to be made in smaller size, resulting in reduction in cost. Using a software program for the digital processing means, the controls of the heating means and the like can flexibly be designed. This achieves a highly precise and subtle temperature control. Further, the digital processing means can also be utilized for a variety of other controls.

For example, the digital processing means may be used to control both the heating means and the magnetic bearing. In such case, the heating means is controlled by the digital processing means such as a DSP disposed in the pump controller to control the magnetic bearing.

The digital processing means may be used to control both the heating means and display means. In such a case, the heating means is controlled by the digital processing means such as a microcomputer disposed in the pump controller to control the display means for displaying information such as a state of pump.

The temperature control process may be intermittently executed by a predetermined time period within which said another control process is repeatedly executed many times. The temperature control process, that does not require frequent execution, is thus-executed by the predetermined time period within which the position control process is executed many times, thereby securing high-speed execution of the position control process.

DESCRIPTION OF THE PREFERRED EMBODIMENTS

Hereafter, preferred embodiments of the present invention will be described with reference to the accompanying drawings.

Figure 1:
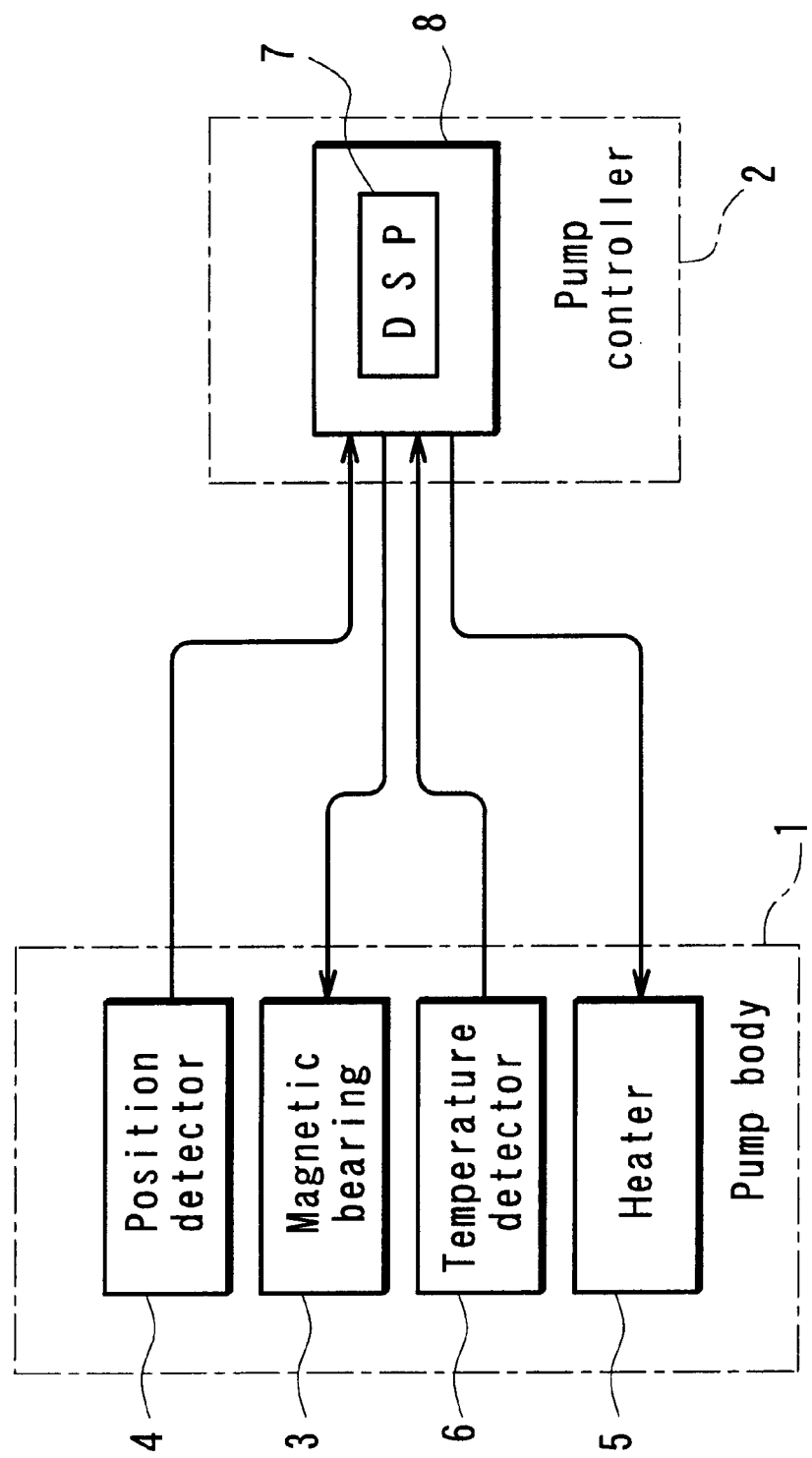
FIG.1 is a schematic diagram showing a turbo molecular pump according to a first embodiment of the present invention.
Figure 2:
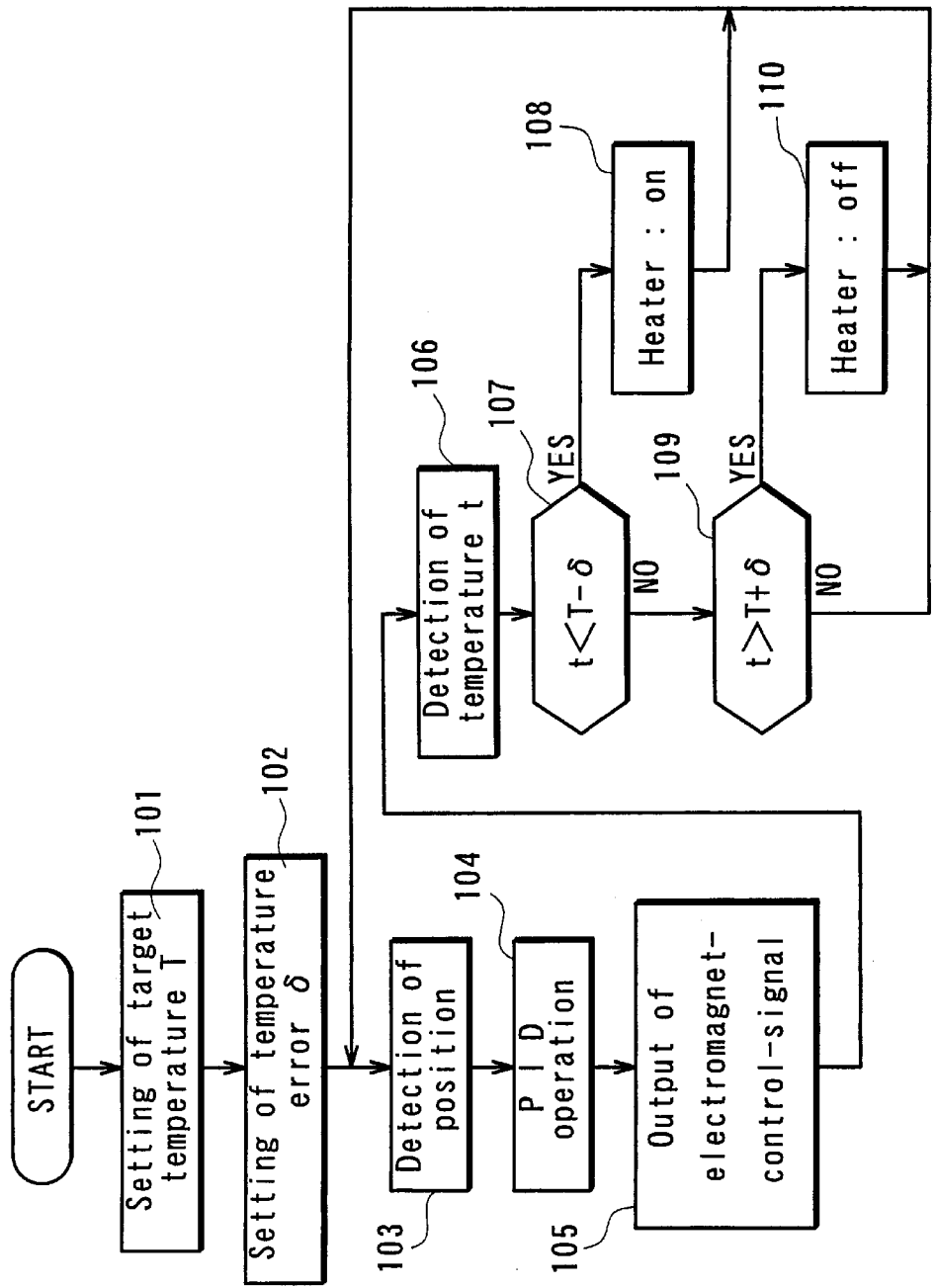
FIG.2 is a flow chart showing an example of process executed by a digital signal processor mounted in a magnetic-bearing controller of a pump controller shown in FIG.1.

FIG.1 and FIG.2 show a first embodiment in which the present invention is applied to a turbo molecular pump having a DSP mounted in a pump controller to control a magnetic bearing. As schematically shown in FIG.1, the turbo molecular pump is composed of a pump body 1 and a pump controller 2.

The pump body 1 includes: a magnetic bearing 3 of a digital control type for magnetically supporting a rotor of a pump in a non-contact manner; a position detector 4 for detecting a position of the rotor; a heater 5 as heating means for heating a predetermined portion inside of the pump body 1; and a temperature detector 6 for detecting a temperature of a predetermined portion inside of the pump body 1.

On the other hand, the pump controller 2 has a magnetic bearing controller 8 in which a DSP 7 serving as digital processing means is mounted.

The magnetic bearing 3 is composed of an axial magnetic bearing and a radial magnetic bearing. The axial magnetic bearing consists of a plurality of electromagnets and is arranged to magnetically support a disk portion of the rotor in a non-contact manner. That is, at one position in an axial direction of the rotor, the disk portion is magnetically supported in the axial direction of the rotor, using the magnetic attraction forces (or magnetic repulsive forces) of the electromagnets. Also, the radial magnetic bearing consists of a plurality of electromagnets and is arranged to magnetically support the rotor in a non-contact manner. That is, at each of two positions in the axial direction of the rotor, the rotor is magnetically supported in two radial directions crossing at right angles to each other, using the magnetic attraction forces (or magnetic repulsive forces) of the electromagnets.

The position detector 4 consists of an axial position detector and a radial position detector. The axial position detector is arranged to detect a position of the rotor in the axial direction thereof. The radial position detector is arranged to detect positions of the rotor in two radial directions crossing at right angles to each other at each of two positions in the axial direction of the rotor.

Hereupon, a detailed description of the magnetic bearing 3, the position detector 4, the heater 5 and the temperature detector 6 is omitted. This is because the known some constructions can be employed for each of these component elements.

The magnetic bearing controller 8 controls the magnetic bearing 3 in response to an output signal of the position detector 4 or the rotor position. Also, the magnetic bearing controller switches on or off the heater 5 in response to an output signal of the temperature detector 6 or the temperature inside of the pump body 1. More specifically, based on the rotor position, the DSP 7 supplies electromagnet control signals for the electromagnets of the magnetic bearing 3 to respective power amplifiers for the electromagnets. The power amplifiers supply excitation currents based on the electromagnet control signals, to the electromagnets, respectively. Thus, the rotor is magnetically supported in a non-contact manner at a predetermined target position. Further, the DSP 7 checks whether or not the temperature inside of the pump body 1 is within a predetermined error range. The DSP 7 switches on the heater 5 to get it into heating state when the temperature is lower than the error range, and the DSP 7 switches off the heater 5 to get it into non-heating state when the temperature is higher than the error range. This maintains the temperature inside of the pump body 1 within a predetermined range to thereby prevent compressed gas from being condensed and then sticking and depositing in the pump body 1. Further, by keeping the temperature within the predetermined range, over-heat of the heater 5 is prevented.

Next, an example of process executed by the DSP 7 mounted in the magnetic bearing controller 8 will be described with reference to a flow chart shown in FIG. 2.

In FIG.2, when the pump starts operating, the DSP 7 sets a target temperature T inside of the pump body 1 (step 101), and then sets a temperature error δ(step 102). Thereafter, a position control process at steps 103 to 105 is executed. At a step 103, the DSP 7 detects the rotor position from an output signal of the position detector 4. Based on the rotor position thus detected, the DSP 7 executes a PID operation (step 104) and supplies electromagnet-control-signals to the respective power amplifiers (step 105).

Subsequently, a heater control process (temperature control process) at steps 106 to 110 is executed. At a step 106, the DSP 7 detects the temperature inside of the pump body 1 from an output signal of the temperature detector 6. The temperature thus detected is defined as t. Then, the temperature t is compared with a lower limit (T−δ) of a temperature error range (step 107). When the temperature t is smaller than (T−δ), advancement to a step 108 is executed to switch on the heater 5. Thereafter, the DSP 7 returns to the step 103.

When the temperature t is not smaller than (T−δ) at the step 107, advancement to a step 109 is executed. At the step 109, the temperature t is compared with an upper limit (T+δ)of the temperature error range. When the temperature t is greater than the upper limit (T+δ), advancement to a step 110 is executed to switch off the heater 5. Thereafter, the DSP 7 returns to the step 103. When the temperature t is not greater than (T+δ) at the step 109, the DSP 7 returns to the step 103. Thus, the temperature inside of the pump body 1 can be maintained within a predetermined range substantially equal to the temperature error range from (T−δ) to (T+δ).

In the above-mentioned process, the position control process to be executed at high speed and the heater control are carried out in one loop consisting of steps 103 to 110. Accordingly, execution of the loop expends a time longer than a time required for execution of the position control process only. However, the DSP 7 still having plenty of performance left is able to execute both controls without any substantial delay for the position control. If the DSP has a performance insufficient to execute both controls at high speed, or if the position control of extremely high speed is required, another process may be employed instead of the above-mentioned process. For example, the position control process may be executed many times during a predetermined time period for intermittent execution of the heater control process that does not require frequent execution as compared with the position control process.

Figure 3:
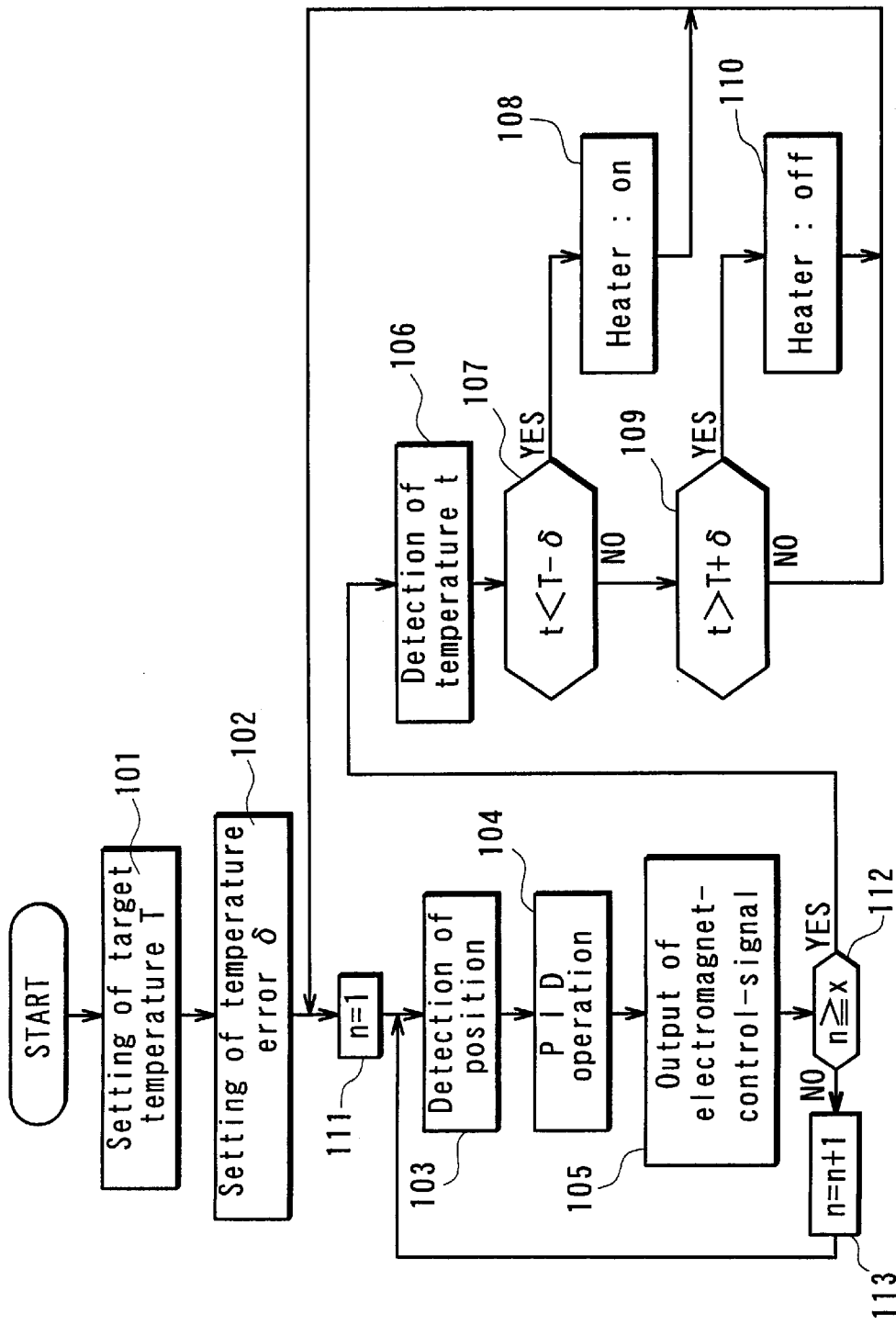
FIG.3 is a flow chart showing another example of process executed by the digital signal processor mounted in the magnetic-bearing controller of the pump controller shown in FIG.1.

FIG.3 is a flow chart showing another processing loop of the position control process and the heater control process. This flow chart has steps 111, 112 and 113 in addition to the steps 101 to 110 same as those shown in FIG.2. In FIG.3, after completion of setting of the target temperature T and the temperature error δ, the DSP 7 sets a count number n for 1 (step 111). Subsequently, the DSP 7 executes the position control process (steps 103 to 105). At a step 112, when the count number n is smaller than a predetermined value X (number of execution of the position control process, e.g., 100, 1000, or another), the DSP 7 replace the count number n with n+1 to increase the count number by one (step 113). Thereafter, the DSP 7 returns to the step 103 and repeatedly executes the position control process. When the count number n is increased up to the predetermined value X at the step 112, the DSP 7 go to the step 106 and executes the heater control process. After completion of the heater control process, the DSP 7 returns to the step 111. Thus, the heater control process is executed during predetermined times execution of the position control process, thereby securing high-speed execution of the position control process.

Incidentally, the magnetic bearing controller 8 may be composed of other digital processing means such as a microcomputer.

Although not shown, the pump body 1 has therein an electric motor for rotationally driving the rotor. Provision may be made such that the electric motor is controlled also by the DSP 7 of the magnetic bearing controller 8 or by another motor controller to be additionally disposed.

Figure 4:
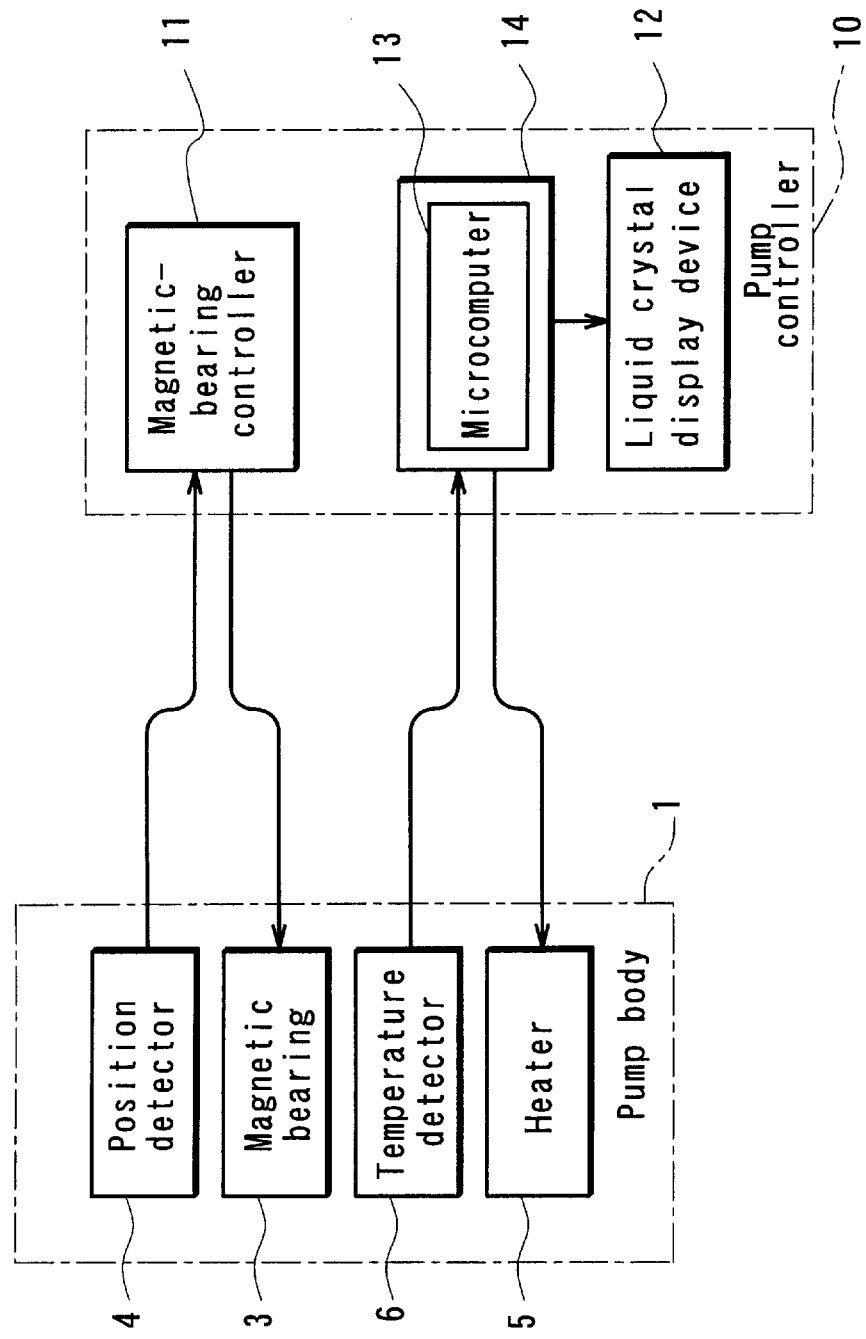
FIG.4 is a schematic diagram showing a turbo molecular pump according to a second embodiment of the present invention.
Figure 5:
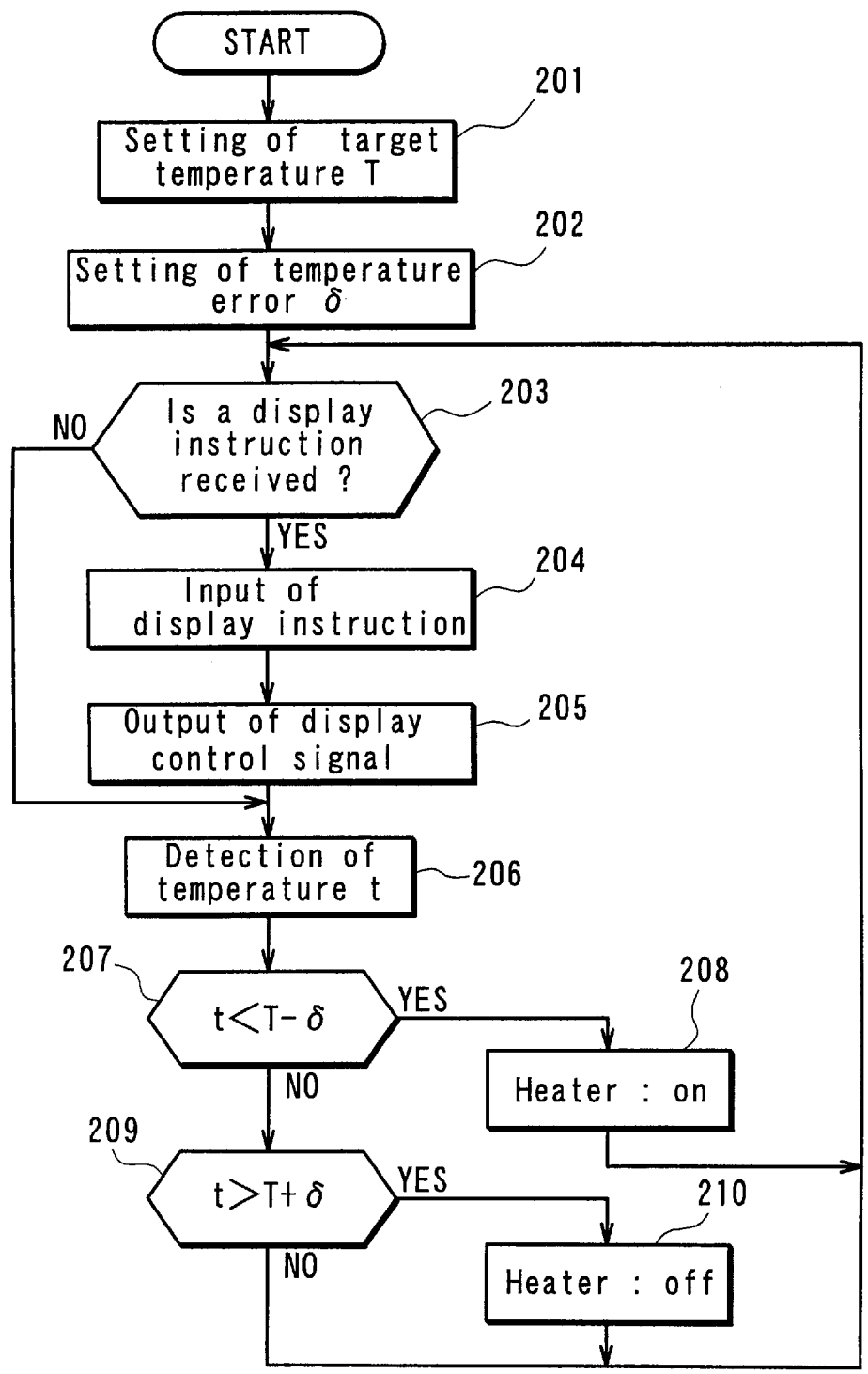
FIG.5 is a flow chart showing an example of process executed by a microcomputer mounted in a display controller in a pump controller shown in FIG.4.

FIG. 4 and FIG. 5 show a second embodiment in which the present invention is applied to a turbo molecular pump having a pump controller with a microcomputer for controlling a liquid crystal display. In the second embodiment, corresponding parts are designated by the same reference numerals used in the first embodiment, and the description about such parts is omitted here.

The pump body 1 of the second embodiment has a configuration identical with that of the first embodiment.

A pump controller 10 of this second embodiment is composed of a magnetic bearing controller 11, a liquid crystal display device 12 as display means, and a display controller 14 having a microcomputer (one-chip microcomputer) 13 serving as digital processing means.

The magnetic bearing controller 11 controls a magnetic bearing 3 in response to an output signal of a position detector 4. As the magnetic bearing controller 11, there may be used other known configuration such as: a digital-type controller using digital processing means such as a DSP or a microcomputer; and an analog-type controller or the like. Therefore, a detailed description of the magnetic bearing controller 11 is omitted here.

The liquid crystal display device 12 is to display information such as a state of pump and has a plurality of liquid crystal display devices. As to the liquid crystal display device 12, too, a detailed description is omitted here since a known optional configuration may be employed.

The display controller 14 controls the liquid crystal display device 12 and also controls the ON/OFF state of the heater 5 in response to an output signal of the temperature detector 6, i.e., in response to the temperature inside of the pump body 1. More specifically, when a component element (not shown) of the pump controller 10 has supplied a display instruction to the microcomputer 13, the microcomputer 13 supplies a display control signal to the corresponding liquid crystal display device. Likewise the DSP 7 in the first embodiment, the microcomputer 13 checks whether or not the temperature inside of the pump body 1 is within a predetermined error range. The microcomputer 13 switches on the heater 5 when the temperature is lower than the error range, and switches off when the temperature is higher than the error range.

Next, referring to a flow chart in FIG. 5, description will be made about an example of process executed by the microcomputer 13 in the display controller 14.

In FIG. 5, when the pump starts operating, the microcomputer 13 sets a target temperature T inside of the pump body 1 (step 201), and then sets a temperature error δ(step 202). Thereafter, a display control of steps 203 to 205 and a heater control of steps 206 to 210 are repeatedly executed. In the display control, it is first checked whether or not the microcomputer 13 has received a display instruction (step 203). When the display instruction has been received, the microcomputer 13 proceeds to the step 204 at which the display instruction is input, and a display control signal corresponding to the display instruction is supplied to the corresponding liquid crystal display device 12 (step 205). Then, the microcomputer 13 proceeds to the step 206. At the above step 203, when it is judged that no display instruction has been received, the microcomputer 13 jumped to the step 206. The heater control process of the steps 206 to 210 is the same as those of the steps 106 to 110 in the first embodiment. The microcomputer 13 returns to the step 203 when the process at the step 208 is finished, when t is not greater than (T+δ) at the step 209, or when the process at the step 210 is finished.

Incidentally, the display controller 14 may be composed of other digital processing means such as a DSP.

Apart from the above-mentioned configuration, the electric motor for rotationally driving the rotor may be controlled also by the magnetic bearing controller 11 or by another motor controller to be additionally disposed.

What is claimed is:

1. A turbo molecular pump comprising:

a pump body including a magnetic bearing for magnetically supporting a rotor in a non-contact manner, a position detector for detecting a position of said rotor, heating means, and a temperature detector; and a pump controller for controlling said magnetic bearing in response to an output of said position detector, said pump controller including digital processing means operated by a software program in which a temperature control process for said heating means based on an output of said temperature detector is executed in intervals between execution of a digital control process for said magnetic bearing.

2. A turbo molecular pump comprising:

a pump body including a magnetic bearing for magnetically supporting a rotor in a non-contact manner, a position detector for detecting a position of said rotor, heating means, and a temperature detector;

a magnetic bearing controller for controlling said magnetic bearing in response to an output of said position detector;

display means for displaying a state of the pump; and digital processing means for controlling said display means and said heating means by a software program in response to an output of said temperature detector executed in intervals between repeated execution of a digital control process for said magnetic bearing.

3. A turbo molecular pump comprising:

a pump body including a magnetic bearing for magnetically supporting a rotor in a non-contact manner, a position detector for detecting a position of said rotor, heating means, and a temperature detector; and a pump controller for controlling said magnetic bearing in response to an output of said position detector, said pump controller including digital processing means in which a temperature control process for said heating means based on an output of said temperature detector and another control process other than said temperature control process are executed by a software program, said temperature control process being intermittently executed by a predetermined time period within which said another control process is repeatedly executed.

* * * * *